United States Patent [19]
Miller et al.

[11] Patent Number: 5,839,104
[45] Date of Patent: Nov. 17, 1998

[54] POINT-OF-SALE SYSTEM HAVING SPEECH ENTRY AND ITEM RECOGNITION SUPPORT SYSTEM

[75] Inventors: Michael S. Miller, Roswell; Janet L. Fath, Atlanta; Diego J. Castaño, Decatur; Joe Wahome, Jr., Marietta, all of Ga.

[73] Assignee: NCR Corporation, Dayton, Ohio

[21] Appl. No.: 602,483

[22] Filed: Feb. 20, 1996

[51] Int. Cl.⁶ .................................................. G01G 23/38
[52] U.S. Cl. .......................... 704/251; 704/250; 704/275; 704/246
[58] Field of Search .............................. 704/2, 2.31, 2.51, 704/2.7, 2.75; 235/472; 379/354

[56] References Cited

U.S. PATENT DOCUMENTS

| | | | |
|---|---|---|---|
| 3,819,012 | 6/1974 | Beck, Jr. et al. | 186/1 A |
| 3,869,575 | 3/1975 | Spitz et al. | 179/1 SA |
| 3,947,817 | 3/1976 | Requa et al. | 340/146.3 MA |
| 4,069,970 | 1/1978 | Buzzard et al. | 235/312 |
| 4,071,740 | 1/1978 | Gogulski | 235/431 |
| 4,369,334 | 1/1983 | Nakatani et al. | 179/1 SM |
| 4,509,129 | 4/1985 | Yatsunami et al. | 364/513.5 |
| 4,549,867 | 10/1985 | Dittakavi | 434/337 |
| 4,602,152 | 7/1986 | Dittakavi | 235/463 |
| 4,605,080 | 8/1986 | Lemelson | 364/567 |
| 4,766,299 | 8/1988 | Tierney et al. | 235/472 |
| 4,947,028 | 8/1990 | Gorog | 235/381 |
| 4,964,167 | 10/1990 | Kunizawa et al. | 381/52 |
| 4,975,948 | 12/1990 | Andresen et al. | 379/355 |
| 5,004,916 | 4/1991 | Collins, Jr. | 250/235 |
| 5,083,638 | 1/1992 | Shneider | 186/61 |
| 5,115,888 | 5/1992 | Schnieder | 186/61 |
| 5,139,100 | 8/1992 | Brauneis | 177/45 |
| 5,140,145 | 8/1992 | Bianco | 235/462 |
| 5,149,211 | 9/1992 | Pettigrew et al. | 400/88 |
| 5,177,800 | 1/1993 | Coats | 381/51 |
| 5,231,293 | 7/1993 | Longacre, Jr. | 250/568 |
| 5,265,075 | 11/1993 | Bergeron et al. | 369/25 |
| 5,297,030 | 3/1994 | Vassigh et al. | 364/405 |
| 5,334,826 | 8/1994 | Sato et al. | 235/455 |
| 5,365,050 | 11/1994 | Worthington | 381/51 |
| 5,454,063 | 11/1993 | Rossides | 704/275 |
| 5,546,475 | 8/1996 | Bolle et al. | 382/190 |
| 5,577,165 | 11/1996 | Takebayashi et al. | 704/275 |

*Primary Examiner*—David R. Hudspeth
*Assistant Examiner*—Daniel Abebe
*Attorney, Agent, or Firm*—Paul W. Martin

[57] ABSTRACT

A point-of-sale system which uses speech entry to identify and tally items without bar code labels, such as produce items. The system includes a microphone, a scale, and a terminal. The terminal uses the microphone to record words from a checker identifying a produce item during a transaction and prompts an operator to identify the produce item by speaking into the microphone when the produce item is placed upon the scale. The terminal also identifies a price for the item and enters the price into the transaction when the produce item is removed from the scale.

10 Claims, 7 Drawing Sheets

POINT-OF-SALE SYSTEM HAVING SPEECH ENTRY AND ITEM RECOGNITION SUPPORT SYSTEM

CROSS-REFERENCE TO RELATED APPLICATIONS

The present invention is related to the following commonly assigned and co-pending U.S. applications:

U.S. application Ser. No. 08/269,703, entitled "Dynamic Key Terminal Including Choice Driven Interface", filed Jul. 1, 1994; and U.S. application Ser. No. 08/248,285, entitled "Diagnostic Speech System For Bar Code Scanners", filed May 24, 1994.

BACKGROUND OF THE INVENTION

The present invention relates to retail point-of-sale (POS) systems, speech recognition devices, speech generating devices, and decision support systems, and more specifically to a POS system which uses a speech and item recognition support system.

At supermarket cash registers, certain items cannot be scanned for Universal Product Codes (UPCs; i.e., "bar codes"). Items such as produce, baked goods, and loose hardware do not have UPCs. Other items are heavy and awkward to scan (e.g., 25 pound bags of dog food or charcoal). When a UPC is not available on an item, cashiers are encouraged to tally the item by typing a Price Look-Up (PLU) number. However, PLU numbers are easily mistyped. Scanning provides a much better method of ensuring that the customer is charged the proper price and helps the store track sales and inventory.

Stores have devised various ways to deal with items with missing and inaccessible UPCs. "Experts" might precheck items at special stations located, for example, in the produce section. Cashiers might be trained and periodically tested on the PLU identifiers. Cashiers might be given textual lists or flip charts of labeled photographs that they can use to search for items and their PLUS. Cashiers might memorize item prices or ask the customer, a fellow cashier, or a supervisor for the name, price, or PLU for a given item. In extreme cases, store employees might revisit stock areas to retrieve PLU identifiers.

As anyone who has ever bought groceries knows, ringing produce is one of the major tie-ups at the check-out counter; it also appears to be a major source of errors. During two initial studies at a grocery store in Atlanta, cashiers entered the correct price 88% of the time. Even though store management encourages cashiers to use PLU numbers, cashiers used them properly only 78% of the time. For the 12% of times that cashiers rang an incorrect price, there was an average overcharge of 23%. In addition, supervisors said that cashiers "hate ringing produce", "it slows them down", and they tend to ring it last.

Within the retail environment, operation of current terminals by employees is not intuitive. Employees must receive training and use the terminals for a predetermined amount of time in order to become proficient at operating the terminals. Inexperienced operators cause delays in the checking lines and are prone to making mistakes.

U.S. Pat. No. 4,369,334 to Nakatani et al. entitled "Audible Announcement In An Electronic Cash Register" discloses a synthetic speech sound generation system which provides an audible announcement of a total price and a "thank you" message.

U.S. Pat. No. 4,947,028 to Gorog entitled "Automated Order And Payment System" discloses a customer-operated remote order entry system which accepts voice commands, and voice entry of companies, products, services, and payment method via voice recognition.

U.S. Pat. No. 5,177,800 to Coats entitled "Bar Code Activated Speech Synthesizer Teaching Device" discloses means for supplying speech data to a speech synthesizer based upon a bar code numerical value.

U.S. Pat. No 5,083,638 to Schneider entitled "Automated Point-Of-Sale Machine" discloses an interface that allows a self-service customer to identify and enter items without bar code labels.

None of these patents proposes a solution that allows a checker to tally items that do not typically have bar code labels, such as produce, or cannot be scanned because their bar code labels are missing in a way that minimizes errors. Therefore, it would be desirable to provide a POS system having speech entry and an item recognition support system. The POS system should include an input terminal and an interface that are intuitive for inexperienced employees to operate and which reduces the likelihood of errors by employees. The item recognition system should include synthetic speech to provide prompts and feedback to a POS operator, speech recognition for item entry, and a decision support system to assist the operator with item identification.

SUMMARY OF THE INVENTION

In accordance with the teachings of the present invention, a POS system having speech entry and an item recognition support system is provided.

The system includes a microphone, a scale, and a terminal. The terminal uses the microphone to record words from a checker identifying a produce item during a transaction and prompts an operator to identify the produce item by speaking into the microphone when the produce item is placed upon the scale. The terminal also identifies a price for the item and enters the price into the transaction when the produce item is removed from the scale.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
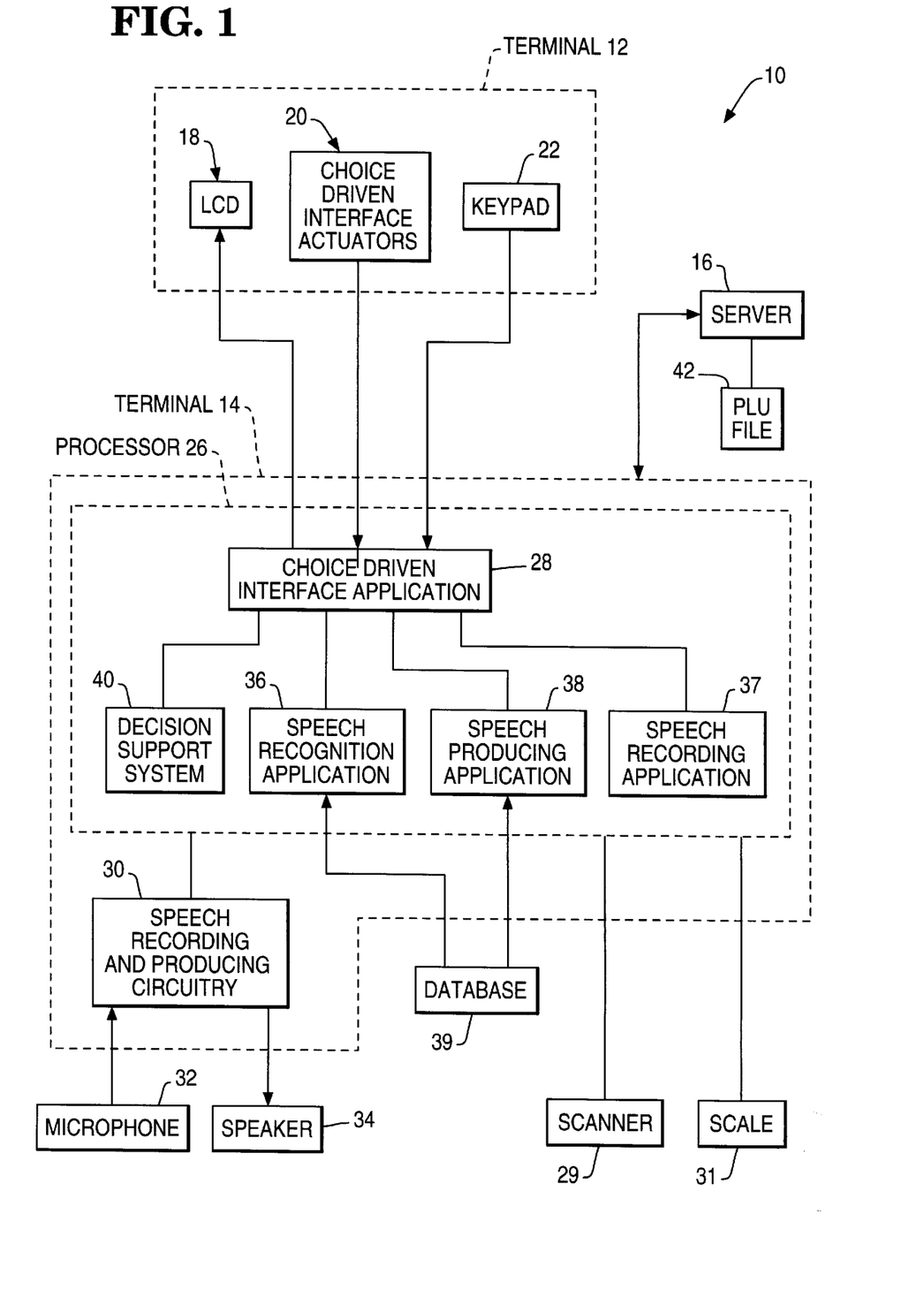
FIG. 1 is a block diagram of a POS system.

Referring now to FIG. 1, system 10 includes terminal 12 and terminal 14. In a network environment, system 10 also includes server 16.

Terminal 12 may be any computer terminal. The terminal illustrated here is the commercially-available Dynakey terminal of the assignee of the present application. Terminal 12 includes liquid crystal display (LCD) 18, choice-driven interface actuators 20, and keypad 22. Terminal 12 may also include other peripheral devices in the same housing such as magnetic stripe reader.

LCD 18 displays a choice-driven interface.

Choice-driven interface actuators 20 are preferably touch sensitive screen portions within LCD 18, although mechanical buttons may also be employed. Choice-driven interface actuators 20 enter user inputs corresponding to displayed interface choices. Actuators 20 record user choices in response to instructions and choice queries displayed by LCD 18. The functions associated with actuators 20 change and are specific to each overlay generated by choice-driven interface application program 28.

Keypad 22 provides standard alphanumeric keys, numerical keys, and other standard retail function keys. Keypad 22 may be used to implement any of the functional choices displayed by choice driven interface 28, either alone or in combination with actuators 20, thereby providing a plurality of ways to accomplish the same function. This concept, called multi-pathing, is employed throughout choice-driven interface 28.

Terminal 14 includes processor 26 and speech recording and producing circuitry 30. Processor 26 executes choice-driven interface application program 28, decision support system 40, speech recognition application 36, speech recording application 37, and speech producing application 38. Processor 26 responds to user inputs from actuators 20 and keypad 22 by displaying instruction and choice query overlays generated by application program 28.

Choice-driven interface application program 28 provides a graphic interface for executing known terminal functions. One example of a choice-driven interface application program 28 is the commercially-available Natural Interface for Computing Environments (NICE) application of the assignee of the present invention. Choice-driven interface application 28 may be implemented to run in a Microsoft Disk Operating System (DOS), Windows environment, or in any other operating system.

Decision support system 40 works in conjunction with choice-driven interface application 28 to assist an operator, such as a checker, with item identification and entry. Decision support system 40 is particularly useful in helping a checker identify and distinguish a produce item from within a category of produce items, e.g., a 'Red Delicious Apple' from any other type of apple.

Speech recognition application 36 includes a speech recognition engine and a speech grammar. The speech recognition engine is any commercially available speech recognition engine. The speech grammar is preferably a BNF speech grammar, which is a representation of all possible utterances if a speaker.

Speech recognition application 36 works in conjunction with decision support system 40 and choice-driven interface application 28 to identify in real time words spoken by the checker which identify items during checkout, to compare in real time words from the speech grammar to words within database 39, and to call decision support system 40 to allow the checker to identify and enter the item into a transaction.

Preferably, speech recognition application 36 is used to enter items that do not have bar code labels, either because the bar code labels have fallen off or been removed, or because the items are not suited for labeling with bar code labels. For example, speech recognition application 36 calls decision support system 40 when a checker says a produce category, such as 'apple'.

Speech recording application 37 works with choice-drive interface application 28 to record words representing items and to store the words in database 39 so they can be accessed later during checkout by speech recognition application 36 and speech producing application 38.

Speech producing application 38 works with choice-drive interface application 28 to recall words from database 39 and convert them to computer-synthesized speech. Speech producing application 38 trains a checker in the correct pronunciation of an item.

Speech recording and producing circuitry 30 works with speech producing application 37 to convert words from database 39 into computer speech.

Speech recognition application 36, speech recording application 37, speech producing application 38, and speech recording and producing circuitry 30 are preferably commercially-available products, such as the IBM Voice Type Application Factory, or the Speech Systems Incorporated Phonetic Engine. Sound Blaster adapter card with Text Assist and NCR Flextalk Synthesizer may be used for speech production.

Although they are shown here as residing in terminal 14, decision support system 40, speech recognition application 36, and speech producing application 38 may be partially resident on both terminal 14 and server 16.

Microphone 32 converts spoken words to electrical signals for storage in database 39.

Speaker 34 converts electrical signals representing words from database 39 into sound.

Server 16 provides price information for items from PLU file 42 to terminal 14, either during bar code scanning or during voice entry of items.

Scanner 29 provides item information to terminal 14 during bar code scanning.

Scale 31 records weights of items such as produce and activates speech recognition application 36 when an item is placed on scale 31.

Database 39 stores symbolic representations of words and pictures representing items within the transaction establishment.

Figure 2:
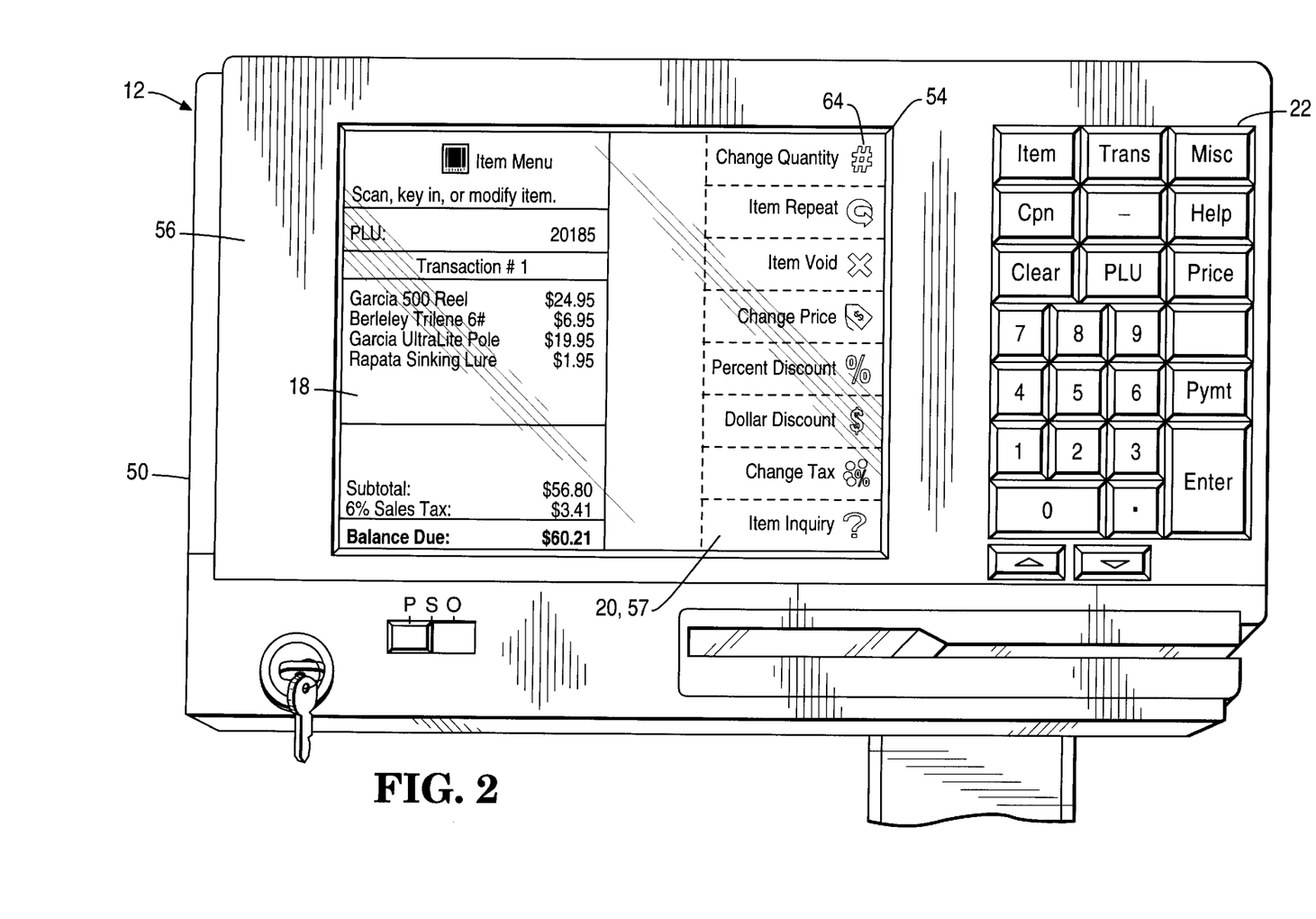
FIG. 2 is front view of a dynamic key terminal within POS system of FIG. 1.

Turning now to FIG. 2, terminal 12 is shown in more detail. Housing 50 includes a display and input portion 56, which includes LCD 18, actuators 20, and keypad 22. Touch screen actuators 57 overlap displayed choices 64.

Figure 3:
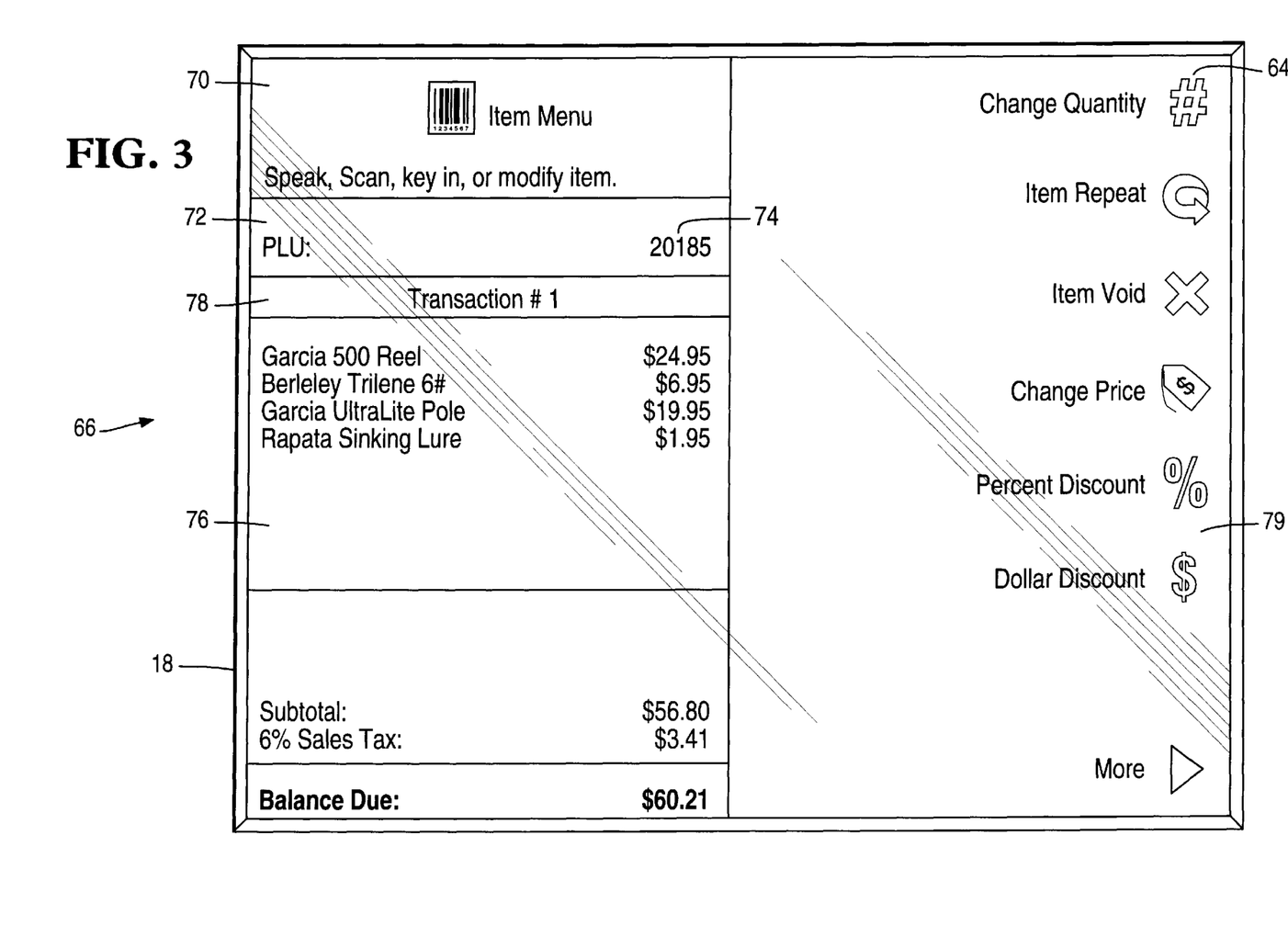
FIG. 3 is a view of the display of the dynamic key terminal illustrating the functional sections of the choice-driven interface.

Turning now to FIG. 3, the choice-driven interface produced by choice-driven interface application 28 is illustrated using item menu overlay 66. Choice-driven interface application program 28 creates a graphic interface which divides LCD 18 into functional sections.

Title and instruction section 70 in the upper left corner of LCD 18 displays the title of the overlay and any instructions.

Prompt section 72 displays prompts for information.

Echo section 74 is adjacent prompt section 52 and displays responses entered by an operator.

List section 76 is in the lower left hand corner and is used to display lists of merchandise items entered through keypad 22 or scanner 29.

List caption section 78 contains information about the number of items displayed in list section 76.

Options section 79 occupies the entire right half of LCD 18 and displays user-driven interface choices 64.

Figure 4:
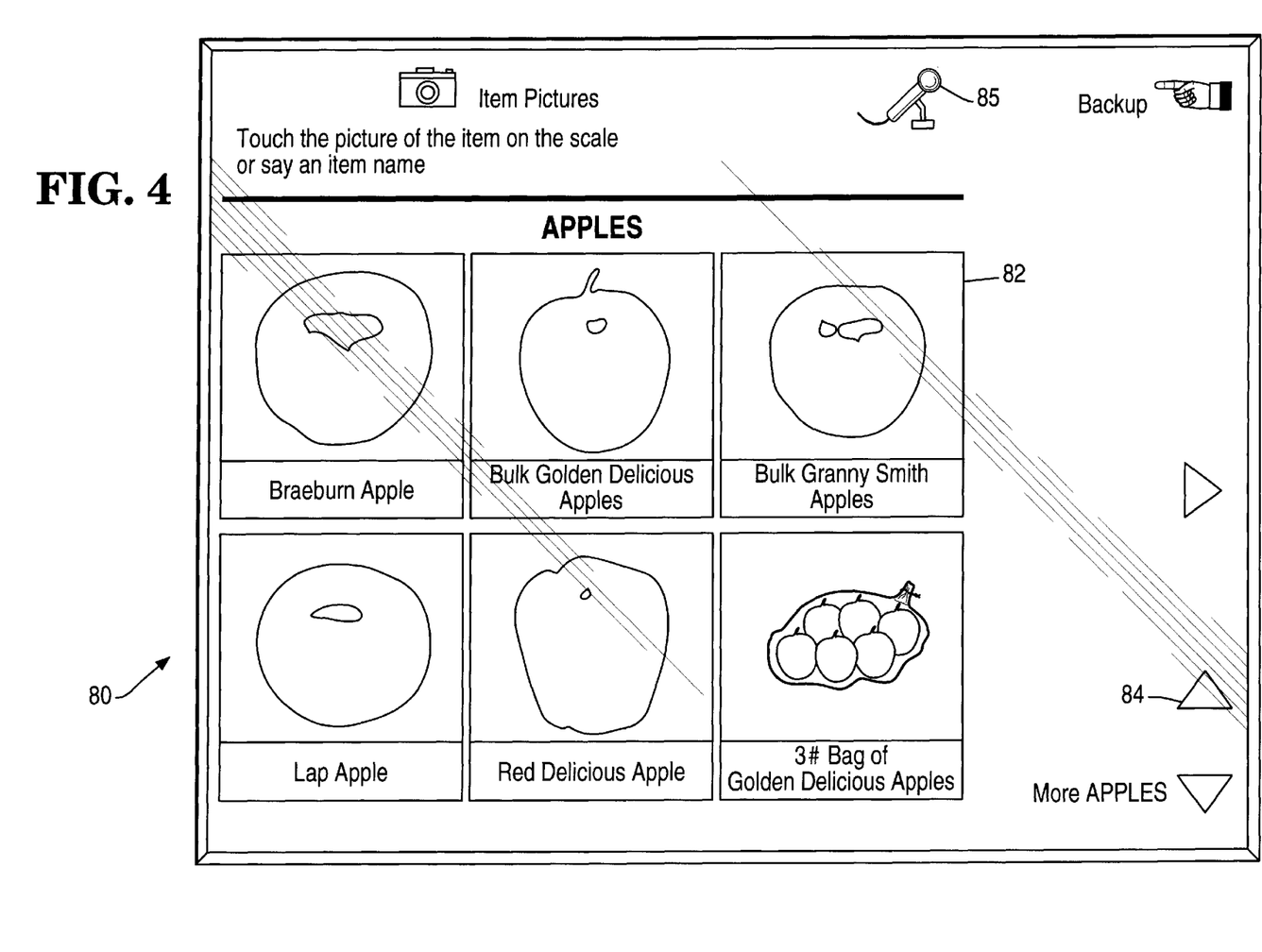
FIG. 4 is a view of an overlay of the choice-driven interface which is generated from information provided by a decision support system.

Turning now to FIG. 4, an overlay 80 which assists a checker with recognition of produce items is illustrated. Overlay 80 forms part of decision support system 40 an includes pictures 82 of produce items within a category of produce items, here apples. Terminal 12 displays overlay 80 when the checker says "apple" into microphone 32. The checker can easily determine the type of apple being purchased by comparing the apple being purchased to the apples in pictures 82. More pictures 82 can be displayed by touching scroll arrows 84.

Microphone icon 85 appears as a prompt to the checker to speak into microphone 32. The icon first appears when a produce item is placed on scale 31 and the scale weight stabilizes. If the checker says the name of an apple, e.g. golden delicious apple, overlay 80 is not displayed. Microphone icon 85 appears in overlay 80 to give the checker another chance to say a produce item or category if the displayed category is incorrect. So long as the produce item is on scale 31, the item is not tallied unless the checker accepts the item provided by speech recognition application 36.

After the checker identifies the type of apple, the checker touches the picture of the apple to enter it's price into the transaction. Speech producing application 38 causes speech recording and producing circuitry 30 and speaker 34 to auralize the name of the apple to teach the checker the name and correct pronunciation of the type of apple purchased. The next time the same type of apple is purchased, the checker can say the name into microphone 32 to enter the apple into the transaction without need for displaying overlay 80.

Figure 5:
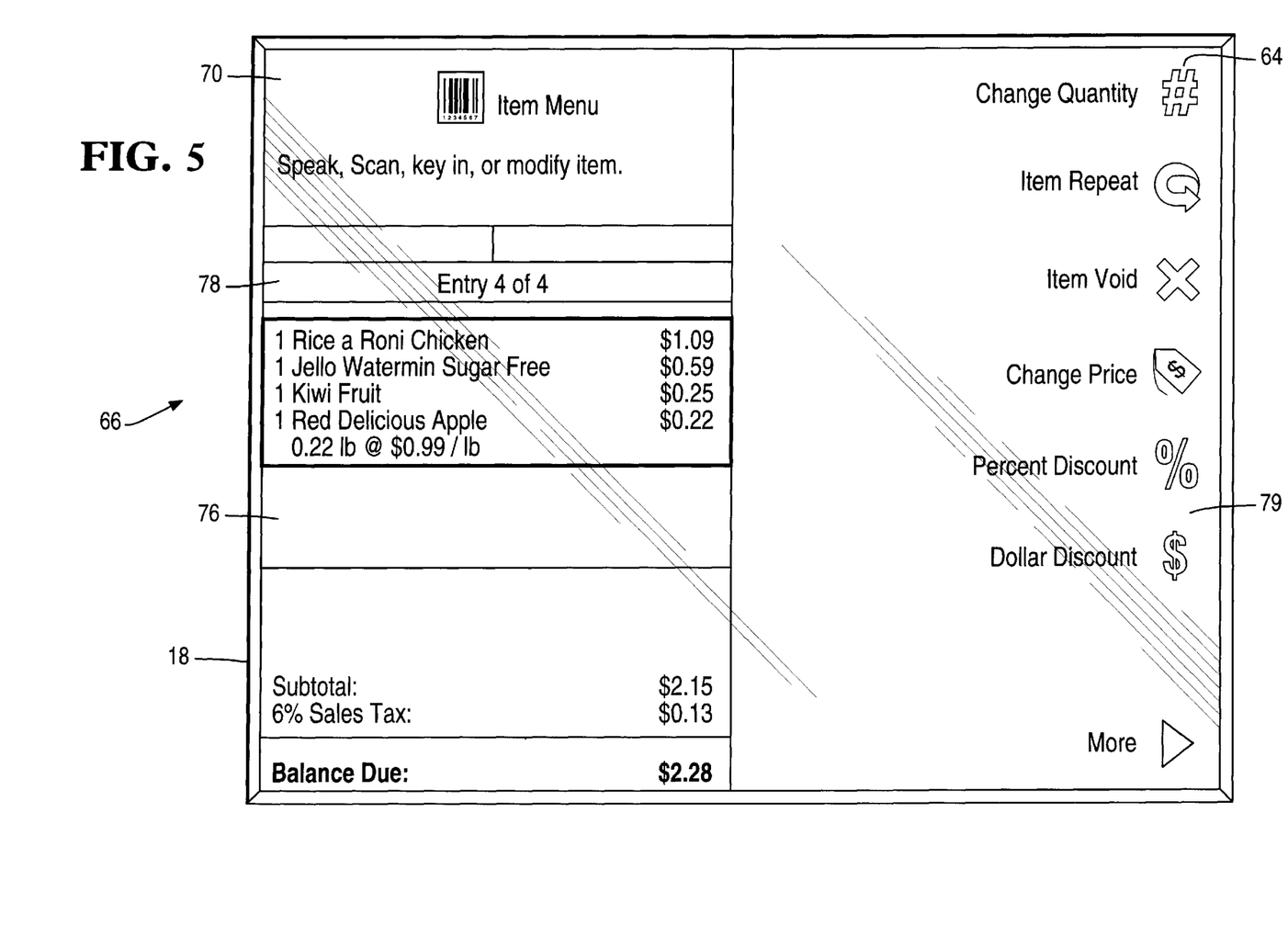
FIG. 5 is a view of another overlay of the choice-driven interface showing a produce item entered using the decision support system.

Turning now to FIG. 5, item menu overlay 66 is once again illustrated to reflect an additional entry 68 for "1 Red Delicious Apple . . . ."

Figure 6A:
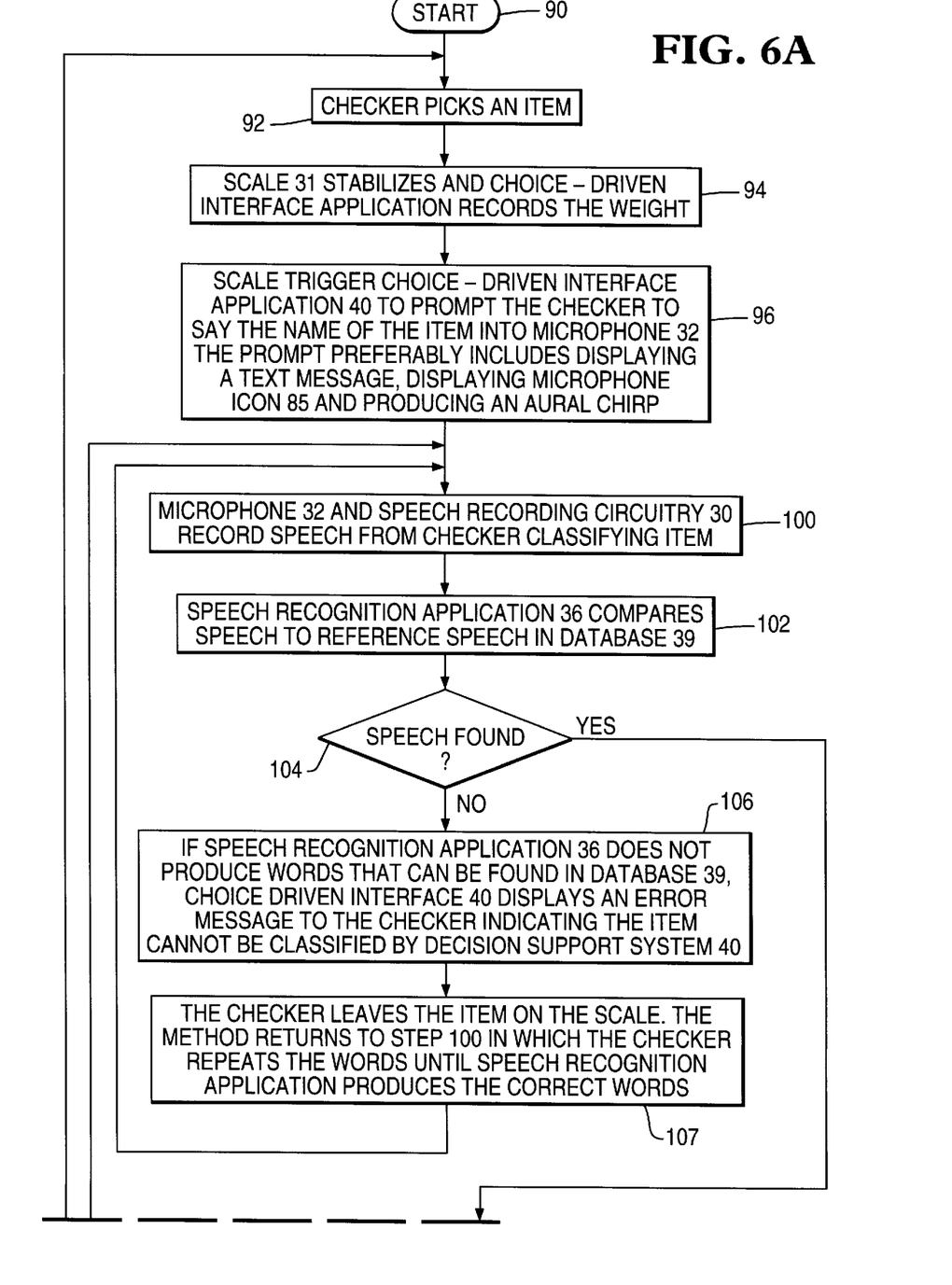
FIGS. 6A and 6B form a flow diagram illustrating the operation of the choice-driven interface and decision support system in connection with a retail transaction.
Figure 6B:
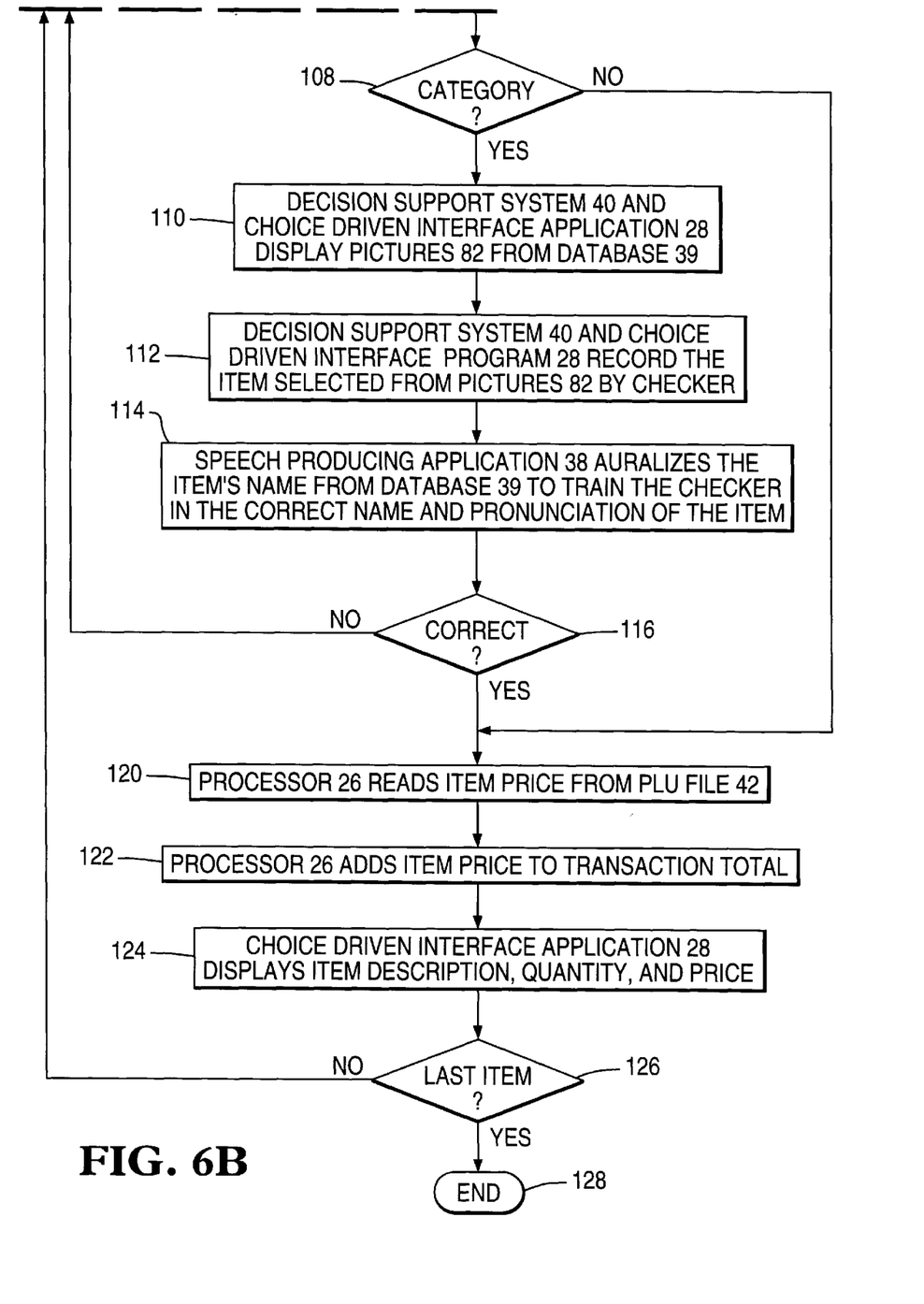

Turning now to FIG. 6, the method of the present invention is summarized beginning with START 90. FIG. 6 illustrates the method used for produce items.

In step 92, a checker picks an item to be purchased during the checkout process and places it on scale 31.

In step 94, scale 31 stabilizes and choice-driven interface application records the weight.

In step 96, scale triggers choice-driven interface application 40 to prompt the checker to say the name of the item into microphone 32. The prompt preferably includes displaying a text message, displaying microphone icon 85, and producing an aural chirp.

In step 100, microphone 32 and speech recording circuitry 30 record speech from checker classifying the item.

In step 102, speech recognition application 36 compares words from the speech grammar to reference words in database 39.

In step 104, speech recognition application 36 determines whether the words from the speech grammar map to words within database 39.

In step 106, if speech recognition application 36 does not produce words that can be found in database 39, choice driven interface 40 displays an error message to the checker indicating the item cannot be classified by decision support system 40.

In step 107, the checker leaves the item on the scale. The method returns to step 100 in which the checker repeats the words until speech recognition application produces the correct words.

Returning to step 104, if speech recognition application 36 is able to map words from the speech grammar to words in database 39, the method proceeds to step 108.

In step 108, decision support system 40 determines whether the words represent a predetermine category of items. If so, the method proceeds to step 110, in which decision support system 40 and choice driven interface application 28 display pictures 82 from database 39. If the words represent the item, the method proceeds directly to step 120.

In step 112, decision support system 40 and choice driven interface program 28 record the item selected from pictures 82 by the checker.

In step 114, speech producing application 38 auralizes the item's name from database 39 to train the checker in the correct name and pronunciation of the item.

In step 116, the checker hears the auralization and determines whether the item identification is correct. If it is not, the checker can leave the item on the scale and re-enter the item in step 100. If it is correct, the method proceeds to step 120.

In step 120, processor 26 reads item price from PLU file 42. This step is preferably triggered by removal of the produce item from scale 31 by the checker.

In step 122, processor 26 adds item price to transaction total.

In step 124, choice driven interface application 28 displays item description, quantity, and price.

In step 126, the checker determines whether the item is the last item. If it is not, the method returns to step 92. If it is, the method ends in step 128.

A similar method can be used to enter items that do not have bar code labels. The major difference is that scale 31 is not required. In this case, the checker must manually initiate item entry on choice-driven interface 28 before speaking into microphone 32.

Although the present invention has been described with particular reference to certain preferred embodiments thereof, variations and modifications of the present invention can be effected within the spirit and scope of the following claims.

We claim:

1. A transaction system comprising:
    a microphone;
    a scale which produces a weight signal when a produce item is placed upon the scale during a transaction; and
    a terminal coupled to the microphone and to the scale which automatically executes speech recognition software, prompts an operator to identify a produce item by speaking its name into the microphone, and determines the identity of the produce item from a database of produce names in response to receipt by the terminal of the weight signal from the scale.

2. The system as recited in claim 1, wherein the terminal also determines a price for the produce item from a price file and enters the price into the transaction when the produce item is removed from the scale.

3. The system as recited in claim 1, further comprising:
    a database of produce names including the name of the produce item;
    wherein the terminal compares the name of the produce item to the produce names in the database to identify the produce item.

4. The system as recited in claim 3, wherein the terminal displays an image of the produce item and records an operator selection acknowledging proper identification of the produce item by the terminal.

5. The system as recited in claim 3, wherein if the operator speaks the name improperly and the terminal is unable to match the improperly spoken name to any of the produce names in the database, the terminal displays an error message requiring the operator to use the microphone to re-record the name of the produce item while the produce item remains on the scale.

6. The system as recited in claim 4, further comprising:

a speaker;

wherein the terminal uses the speaker to produce audible sounds representing the name of the produce item after recording the operator selection of the produce item to train the operator to correctly pronounce the name of the produce item.

7. A method of purchasing a produce item comprising the steps of:

(a) recording a weight of the produce item and generating a weight signal by a scale;

(b) automatically executing speech recognition software and prompting an operator to speak a name associated with the produce item into a microphone by a computer in response to receipt of the weight signal by the computer;

(c) recording speech representing the name of the produce item by the speech recognition software;

(d) comparing the speech to a database of produce names including the name of the produce item to identify the produce item by the speech recognition software;

(e) determining a price for the produce item by the computer from a price file; and (f) adding the price to the transaction.

8. The method as recited in claim 7, further comprising the step of:

(g) if the speech is not within the database, displaying an error message to the operator and prompting the operator to speak the name associated with the produce item into the microphone while the produce item remains on the scale.

9. The method as recited in claim 7, further comprising the steps of:

(g) displaying an image of the produce item from the database by the computer; and (h) recording a selection by operator acknowledging proper identification of the produce item.

10. The method as recited in claim 9, further comprising the step of:

(i) generating audible sounds through a speaker representing the name of the produce item to train the operator to correctly pronounce the name of the produce item.

\* \* \* \* \*